(12) United States Patent
Greis et al.

(10) Patent No.: US 7,286,536 B2
(45) Date of Patent: Oct. 23, 2007

(54) METHOD AND SYSTEM FOR EARLY HEADER COMPRESSION

(75) Inventors: Marc Greis, Irving, TX (US); Khiem Le, Coppell, TX (US)

(73) Assignee: Nokia Corporation, Espoo (FI)

( * ) Notice: Subject to any disclaimer, the term of this patent is extended or adjusted under 35 U.S.C. 154(b) by 1060 days.

(21) Appl. No.: 10/281,111

(22) Filed: Oct. 28, 2002

(65) Prior Publication Data

US 2004/0081151 A1    Apr. 29, 2004

(51) Int. Cl.
*H04L 12/28* (2006.01)
(52) U.S. Cl. ............ 370/392; 370/469; 370/474; 370/389
(58) Field of Classification Search ........ 370/230, 370/389, 477, 498, 521, 328, 338, 345, 349
See application file for complete search history.

(56) References Cited

U.S. PATENT DOCUMENTS

2002/0001298 A1*  1/2002  Tourunen et al. .......... 370/349
2002/0032800 A1*  3/2002  Puuskari et al. ........... 709/246
2002/0097723 A1   7/2002  Tourunen et al.
2002/0191556 A1* 12/2002  Krishnarajah et al. ..... 370/329

FOREIGN PATENT DOCUMENTS

| EP | 1056259 | 11/2000 |
|----|---------|---------|
| EP | 1122925 | 8/2001  |

* cited by examiner

*Primary Examiner*—Duc Ho
(74) *Attorney, Agent, or Firm*—Squire, Sanders & Dempsey L.L.P.

(57) ABSTRACT

The present invention relates to a method and system for early compression of a header portion of data packet(s) transmitted after establishment of a packet data connection. A compression information is obtained from a signaling used to establish at least a part of said packet data connection, and is used for the early compression of the header portion. Thereby, even the first data packet(s) can header-compressed to thereby enhance compression efficiency and reduce delay in transmission-window based packet connections with a slow start phase.

32 Claims, 3 Drawing Sheets

METHOD AND SYSTEM FOR EARLY HEADER COMPRESSION

FIELD OF THE INVENTION

The present invention relates to a method, apparatuses and a system for compressing a header portion of data packets transmitted via a packet data connection, as for example an IP (Internet Protocol) or UMTS (Universal Mobile Telecommunications System) connection.

BACKGROUND OF THE INVENTION

In communication networks using packet data transport, individual data packets carry in a header section an information needed to transport the data packet from a source application to a destination application. The actual data to be transmitted is contained in a payload section.

The transport path of a data packet from a source application to a destination application usually involves multiple intermediate steps represented by network nodes interconnected through communication links. These network nodes, called packet switches or routers, receive the data packet and forward it to a next intermediate router until a destination network node is reached which will deliver the payload of the data packet to the destination application. Due to contributions of different protocol layers to the transport of the data packet, the length of a header section of a data packet may even exceed the length of the payload section.

Data compression of the header section may therefore be employed to obtain better utilization of the link layer for delivering the payload to a destination application. Header compression reduces the size of a header by removing header fields or by reducing the size of header fields. This is done in a way such that a decompressor can reconstruct the header if its context state is identical to the context state used when compressing the header. Header compression may be performed at network layer level (e.g. for IP headers), at transport layer level (e.g. for User Datagram Protocol (UDP) headers or Transport Control Protocol (TCP) headers), and even at application layer level (e.g. for Hyper Text Transport Protocol (http) headers).

The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP identifier field changes and the typical inter-packet increase in sequence numbers or time stamps.

Existing header compression schemes do not work well when used over links with significant error rates and long round-trip times. For many bandwidth limited links where header compression is essential, such characteristics are common. In the IETF (Internet Engineering Task Force) specification RFC 3095, a robust header compression (ROHC) scheme is specified as a highly robust and efficient header compression scheme for RTP/UDP/IP (Real Time Transport Protocol, User Data-gram Protocol, Internet Protocol), UDP/IP, and ESP/IP (Encapsulating Security Payload) headers. Generally, a packet corresponds to a unit of transmission and reception, e.g. a protocol data unit. The packet is compressed and then decompressed e.g. by ROHC.

The packet stream corresponds to a sequence of packets where the field values and change patterns of field values are such that the headers can be compressed using the same context. When the context of the decompressor is not consistent with the context of the compressor, decompression may fail to reproduce the original header. This situation may occur when the context of the decompressor has not been initialized properly or when packets have been lost or damaged between compressor and decompressor. Context repair mechanisms are mechanisms which bring the contexts in synchronization when they were not. This is needed to avoid excessive loss due to context damage.

The main reason why header compression can be done at all is the fact that there is significant redundancy between header fields, both within the same packet header but in particular between consecutive packets belonging to same packet stream. By sending static field information only initially and utilizing dependencies and predictability for other fields, the header size can be significantly reduced for most packets. Relevant information from past packets is then maintained in the context. The context information is used to compress or decompress subsequent packets.

Thus, in conventional header compression schemes, it is typically necessary to send full packet headers in the first packet(s) of a connection.

However, Internet network layer services (Internet Protocol Service) are unreliable. IP does not guarantee datagram delivery, in-order delivery of datagrams, and integrity of the data in the datagrams. In IP services, datagrams can overflow router buffers and never reach their destination, datagrams can arrive out of order, and bits in the datagram can get corrupted.

TCP (Transmit Control Protocol) creates a reliable data transfer service on top of IP's unreliable best-effort service. Once a-TCP connection is established between the two end-systems, the application process at the sender provides bytes to the senders TCP send buffer. TCP grabs portions of a maximum segment size (MSS), encapsulates each portion within a TCP segment, and passes the segments to a network layer for transmission across the network. The TCP congestion window regulates the times at which the segments are sent into the network. Initially, during a phase of a congestion control procedure, the congestion window increases exponentially, i.e. the congestion window is initialized to one MSS, after one round trip time (RTT) the window is increased to two segments, after two RTTs the window is increased to four segments, after three RTTs the window is increased to eight segments, etc. This phase of the algorithm is called slow start because it begins with a small congestion window equal to one MSS. The slow start phase ends when the window size exceeds the threshold value. Once the congestion window is larger than the current threshold value, the congestion window grows linearly rather than exponentially. This has the effect of increasing the congestion window by one in each RTT for which an entire windows worth of acknowledgements arrives.

Due to the fact that, even if header compression schemes are used, a full (non-compressed) packet header of considerable length is sent in the first packet(s) of a connection, a high error probability must be assumed for transmission over lossy links. Consequently, the chance of going into the slow start phase and delaying the transaction is high.

SUMMARY OF THE INVENTION

It is therefore an object of the present invention to provide an improved header compression scheme, by means of which compression efficiency and transaction speed can be improved.

This object is achieved by a method of compressing a header portion of data packets transmitted via a packet data connection, said method comprising the steps of:
obtaining a compression information from a signaling used to establish at least a part of said packet data connection; and
using said compression information for compressing the header portion of at least one data packet transmitted after establishment of said packet data connection.

Furthermore, the above object is achieved by a compression device for compressing a header portion of data packets transmitted via a packet data connection, said device comprising:
control means for obtaining a compression information from a signaling used to establish at least a part of said packet data connection; and
header compressing means for compressing based on said obtained compression information the header portion of at least one data packet transmitted after establishment of said packet data connection.

Finally, the above object is achieved by a decompression device for decompressing a header portion of data packets transmitted via a packet data connection, said device comprising:
control means for deriving a decompression information specifying said decompression; and
header decompressing means for decompressing based on said derived decompression information the header portion of at least one data packet transmitted after establishment of said packet data connection.

Accordingly, in cases where signaling which has been performed before the first packet of a connection was sent has already contained some fields of the headers for the packets in this connection, it is not necessary to send the first packet or other packets with a full header. This can lead to an additional improvement in bandwidth efficiency, which is especially significant for connections with short life-times. Moreover, this can lead to an improved transmission of the initial messages in a TCP connection. The initial packet in a TCP connection, e.g. the SYN packet, could be sent with a compressed header, which potentially allows it to fit into fewer RLC blocks, thus increasing the probability of successful transmission. Therefore the chance of going into slow start is reduced. The proposed solution thus provides advantages of compression, e.g. bandwidth savings and reduced delay, from the very first messages. These advantages can be significant for short-lived sessions.

The signaling may be a signaling used for activating a context of the packet data connection., e.g. a PDP context activation signaling of the Universal Mobile Telecommunications System (UMTS).

As an alternative, the signaling may be a signaling used for setting up a virtual pipe or tunnel, e.g. a Resource Reservation Protocol (RSVP) signaling. Then, the proposed early header compression may be performed between network nodes connected to said virtual pipe or tunnel. These network nodes may be endpoints of said virtual pipe or tunnel.

Furthermore, the compression information may comprises at least one of an IP destination address, an IP source address, an IP version, a port number, a flow label value, a protocol identification, a security parameter index, a type of service, a traffic class, a destination port range and a source port range.

The signaling information may be obtained from a traffic flow template of said signaling.

Particularly, the header portion of said first packet may be compressed by removing those header field portions which information has already been transferred by said signaling.

As an example, the first data packet may be a SYN packet of a TCP connection.

The data bits saved by said header compression can be used e.g. for error correction purposes. Thereby, the likelihood of packet errors can be further reduced. If the packets are shorter, the probability of having a bit error in the packet is reduced.

An information specifying the compression of said at least first data packet may be provided to said packet data network, and an additional standard header compression function of said packet data network may be initialized based on said provided information. The header compression and the standard header compression function may be performed concurrently. The standard header compression function may be a PDCP header compression. The header compression may be implemented as a part of the standard compression function. The header compression and the standard header compression function may be controlled by a terminal device connected to said packet data connection.

Additionally, the header compression may be negotiated between a compressor functionality and a decompressor functionality. This negotiation is based on a preliminary signaling or on a bit setting in a predetermined signaling message. As an alternative, it may be detected at the decompressor functionality if the header compression is used. This may be achieved by checking expected header field values.

The compression device may be arranged in a terminal device of a cellular network or in a router device of a packet data network. The decompression device may be an SGSN (Serving GPRS Support Node), a GGSN (Gateway GPRS Support Node), or an RNC (Radio Network Controller).

Further advantageous modifications are defined in the dependent claims.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

Figure 3:
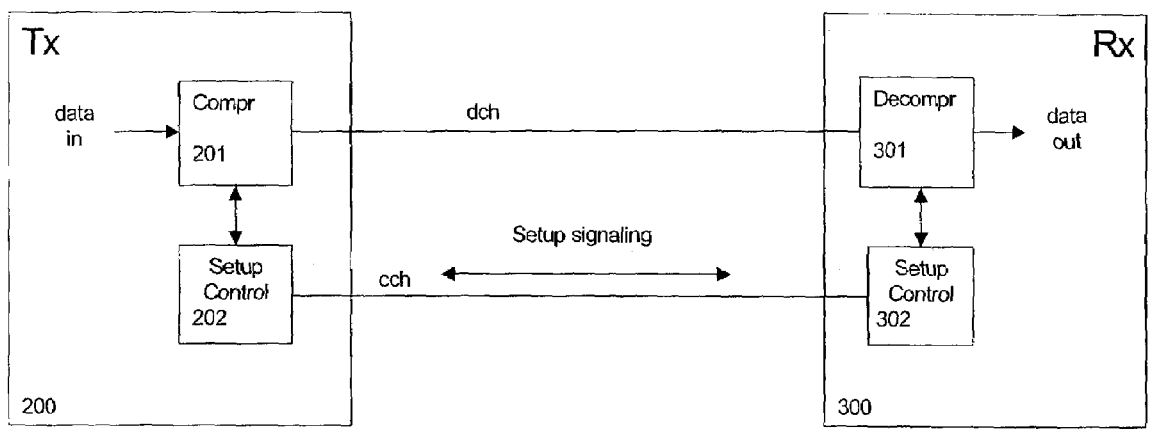
FIG. 3 shows a schematic block diagram of a header compression/decompression system according to the preferred embodiments.

The preferred embodiments will now be described on the basis of a packet data transmission link between a transmitting entity 200 and a receiving entity 300, as indicated in FIG. 3. The transmission entity 200 and the receiving entity 300 may be routers of an IP-based network, e.g. an IP-based cellular network.

Figure 1:
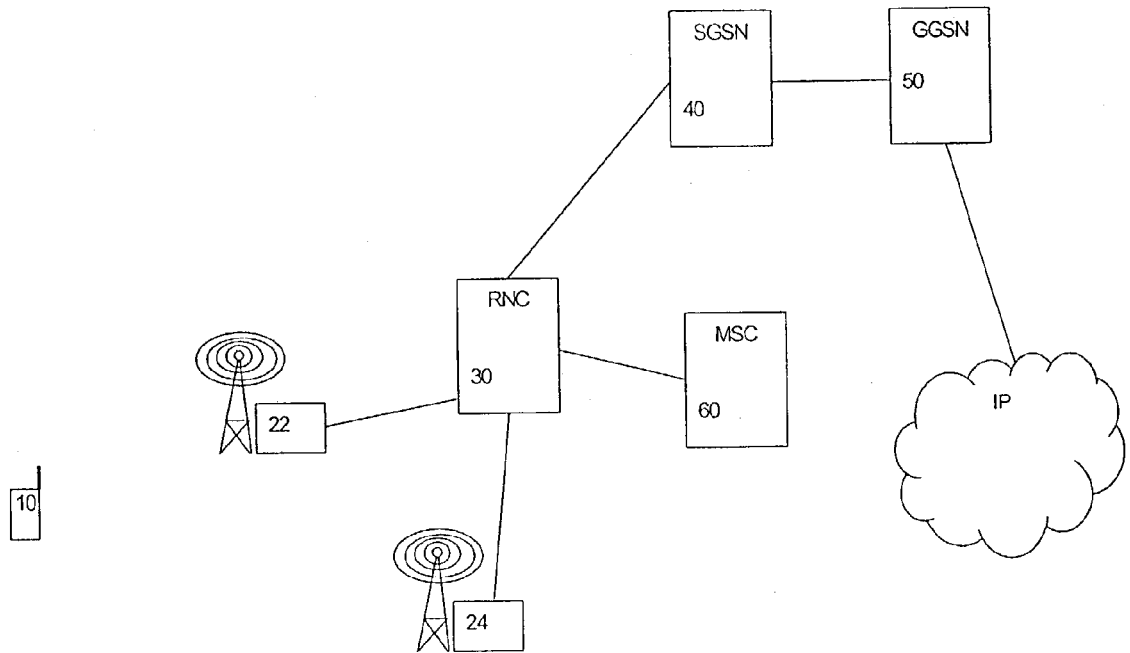
FIG. 1 shows a schematic block diagram of a network architecture in which the present invention can be implemented.

The present invention can be applied e.g. in a radio access network of a mobile or cellular network architecture as shown in FIG. 1, or in fixed networks. FIG. 1 shows a UMTS Terrestrial Radio Access Network (UTRAN) comprising at least one centralized controllers, e.g. radio network controller (RNC) 30 and Node Bs or, generally speaking, base station devices 22, 24. In particular, all radio interface protocols are terminated in the base station devices 22, 24. According to FIG. 1, the base station devices 22, 24 are connected via the RNC 30 to a core network, e.g. a UMTS network, which comprises a packet-switched domain, e.g. a General Packet Radio Services (GPRS) network comprising a Serving GPRS Support Node (SGSN) 40 and a Gateway GPRS Support Node (GGSN) 50 which provides access to an IP network. Furthermore, the core network comprises a circuit-switched domain, e.g. a GSM (Global System for Mobile communication) based network with a Mobile Switching Center (MSC) 60. Further details regarding this architecture can be gathered from the 3GPP (3$^{rd}$ Generation Partnership Project) specification TS 23.060.

The present compression and decompression scheme according to the preferred embodiment is designed to cope with any kind of data packet headers, such as for example IPv4 or IPv6 headers.

Figure 2A:
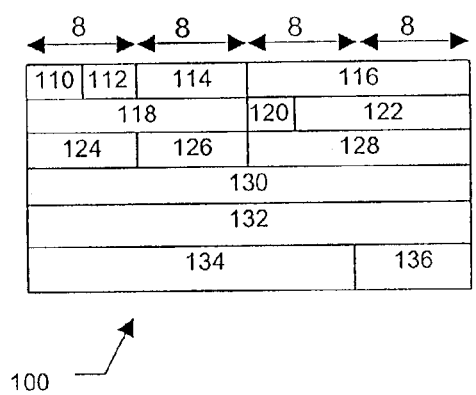
FIGS. 2A and 2B show a schematic representation of Ipv4 and IPv6 header portions, respectively.
Figure 2B:
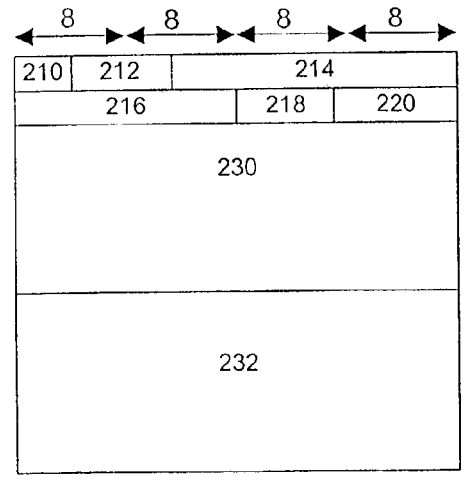

FIGS. 2A and 2B show schematic representations of formats of an IPv4 or IPv6 header portion, respectively. According to FIG. 2A, the IPv4 header consists of six 32-bit words which comprise a version field 110 specifying the protocol version, e.g. "4" for IPv4, an Internet Header Length (IHL) field 112 specifying the length of the Internet header in 32-bit words, a type of service field 114 specifying the desired quality of service (QoS) parameters, a total length field 116 specifying the total packet length, an identification field 118 specifying an identification value used when the IP datagram is fragmented, a flag field 120 specifying three control flags, a fragment offset field 122 specifying a fragment position in the original datagram, a time to live field 124, a protocol field 126, a header checksum field 128, a source address field 130 specifying a 32-bit address of the source of the concerned data packet, a destination address field 132 specifying a 32-bit address of the destination of the concerned data packet, an option field 134, and a padding field 136.

Furthermore, according to FIG. 2B, the IPv6 header is streamlined in comparison to the IPv4 header but may contain extensions (not shown). These extensions allow the header to remain a fixed length for simpler processing while allowing extensibility. The IPv6 header offers a 128-bit address to thereby remove the limited IPv4 address space. In particular, the IPv6 header consists of ten 32-bit words and comprises a version field 210 specifying the protocol version, e.g. "6" for IPv6, a traffic class field 212 specifying a parameter to be used for a differentiated services (DiffServ) function, a flow label field 214 specifying a parameter to be used for identifying packets belonging to the same flow, a payload length field 216 specifying the payload length in octets including extension headers, a next header field 218, a hop limit field 220, a source address field 230 specifying a 128-bit address of the source of the concerned data packet, and a destination address field 232 specifying a 128-bit address of the destination of the concerned data packet.

FIG. 3 shows a schematic diagram of header compression control system comprising a transmitting entity 200 with a setup control unit 202 and a compressor 201 for header compression. Similarly, at the receiving unit 300 a setup control unit 302 and a decompressor 301 are provided. The setup control unit 202 and the compressor 201 of the transmitting entity 200 may be arranged as a single unit or as software routines of a program stored at the transmitting entity 200. The same may apply to the decompressing control unit 302 and the decompressor 301 at the receiving entity 300. The transmitting and receiving entities 200, 300 may be arranged in any network node or terminal device of the cellular network part or fixed network part of the network architecture shown in FIG. 1.

It is noted that the two-line connection shown in FIG. 3 and comprising a control channel cch, which may be an out-of-band channel, and a data channel dch for connecting the compressor 201 and the decompressor 301 is to be regarded as a general or simplified representation, as the data channel dch and the control channel cch may as well relate to different signaling streams or packet units of different protocol layers.

According to the preferred embodiments of the present invention, an early header compression scheme is proposed, in which preliminary control signaling for connection setup between the transmitting entity 200 and the receiving entity 300 is checked at the setup control unit 202 of the transmitting entity 200 for any redundant transmission of header information. Based on this redundant information, the compressor 201 is controlled by the setup control unit 202 so as to remove or at least shorten or compress header field(s) containing detected redundant information. This may be applied to any header type, e.g. IPv4 or IPv6, of at least the first data packet transmitted through the established connection.

Similarly, the setup or any other preliminary signaling may be used by the setup control unit 202 of the transmitting entity 200 to inform the receiving entity 300, e.g. the setup control unit 302 thereof, about the early compression. As an alternative, the decompressor 301 may be adapted to detect initial data packets with early compressed header portions based on a plausibility check, e.g. check for predetermined header fields or header field values.

The setup signaling may be e.g. a PDP context activation procedure in UMTS, an RSVP signaling of the Transmission Control Protocol (TCP) in IP-based networks, which may already supply to the receiving entity 300 information of some of the above identified fields of the IPv4 or IPv6 headers, e.g. IP addresses, port numbers, flow label values, protocol IDs, etc., or any other headers of the packets in this connection. In this case, early header compression can be applied and it is not necessary to send the first packet with a full header. When applied to protocols such as TCP, the chance of slow start is reduced, since initial messages such as SYN, when compressed, have a higher chance of successful transmission, since a fewer number of bits need to be transmitted.

There are scenarios where the setup signaling is used to establish a "connection", which could be e.g. a layer 2 connection like a radio bearer or a virtual "pipe" with a certain QoS, etc.. This signaling would contain a certain set of header fields which are used to identify the packets which are associated with this connection. These fields can be detected by the setup control unit 202 of the transmitting entity 2002 and used to already compress the header of the first packet in the connection.

In the following the first preferred embodiment will be described, in which the PDP Context Activation Procedure in 3GPP networks is used for obtaining information for the proposed early header compression.

Figure 4:
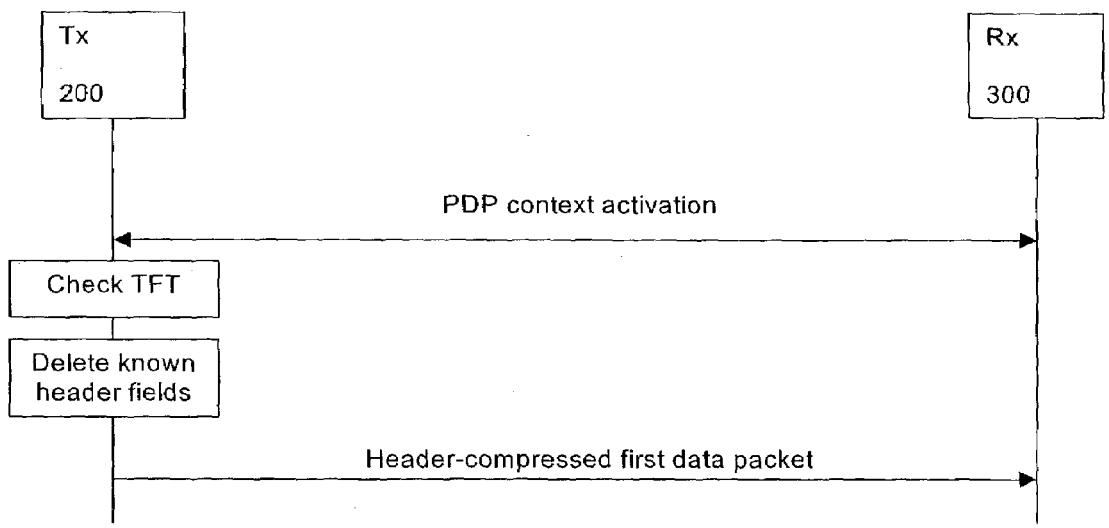
FIG. 4 shows a schematic flow diagram of a header compression initiation procedure according to a first preferred embodiment.

FIG. 4 shows a diagram indicating a signaling and processing scheme according to the first preferred embodiment. This procedure is used to establish a PDP Context, i.e. both a radio bearer and a tunnel-of a GPRS Tunneling Protocol (GTP) in the fixed core network part. In particular, a TFT (Traffic Flow Template) can be used in this procedure to determine during PDP context activation at both connection endpoints, e.g. at the GGSN 50 and at the mobile terminal 10, which packets belong to a PDP context. The TFT consists of packet filters,which can contain the following fields:

Source Address and Subnet Mask (note that the source address is the address of the remote endpoint, and the destination address is the address of the mobile terminal, which is of course known by default)

Protocol number (IPv4) or Next Header (IPv6)

Destination Port Range

Source Port Range

IPSec Security Parameter Index

Type of Service (IPv4) or Traffic Class (IPv6) and mask

Flow Label (IPv6)

It is clear that none of these fields has to be sent in the header of the first packet(s) if the value of the field is already uniquely identified in the TFT. Furthermore, it is noted that all of these filter fields are optional, and some of them describe ranges. Also, as the TFT may contain more than one filter, even fields which are unique in one filter may not be unique in the whole TFT. However, the TFT is fully controlled by the mobile terminal 10, which implies that the mobile terminal can attempt to set as many fields as possible in a unique manner. A simple algorithm can then be used at the network side, e.g. at the setup control unit 302 of the receiving entity 300 to determine which of these fields are unique.

As indicated in FIG. 4, the TFT is checked at the setup control unit 202 of the transmitting entity 200, i.e. at the mobile terminal 10, to determine redundant header fields, and the compressor 201 is then controlled to delete or compress the known or redundant header fields. The obtained header-compressed first data packet(s) is/are then transmitted to the receiving entity 300 at the network side.

It is noted that the checking operation may be based as well on other PDP signaling parameters, such as e.g. a PDP address parameter and/or a PDP type parameter.

There are several points where the receiving entity 300 with the "early" decompressor 301 can be located. On the one hand, it can be arranged at the SGSN 40 or at the GGSN 50. This implies that the early compression is independent from the "standard", e.g. ROHC (Robust header compression) or 3GPP standardized, header compression, which takes place at the RNC 30. In this case, it is necessary to provide hooks or links between the early compression and the standard header compression, because PDCP (Packet Data Conversion Protocol) needs to be made aware of the fact that the first packet is already compressed, and PDCP also needs to know the values of the header fields which were already compressed from the header, as it needs this information to initialize the standard header compression. These "hooks" would require standardization, but only if both early header compression and PDCP header compression are intended to be active at the same time. The other cases can still be implemented on a non-standardized basis. The mobile terminal 10 has a complete view of the early header compression and PDCP compression, and therefore can do some coordination, to ensure that both are not turned on at the same time.

On the other hand, the receiving entity 300 with the "early" decompressor 301 can be arranged at the RNC 30. In this case, the early compression can be implemented as a part of the standard header compression. It is also possible to implement early compression on a non-standardized basis here, as there is no need for any standardized hooks or links between early compression and standard header compression.

In the following the second preferred embodiment will be described, in which the RSVP signaling of the IP network is used for obtaining information for the proposed early header compression.

Figure 5:
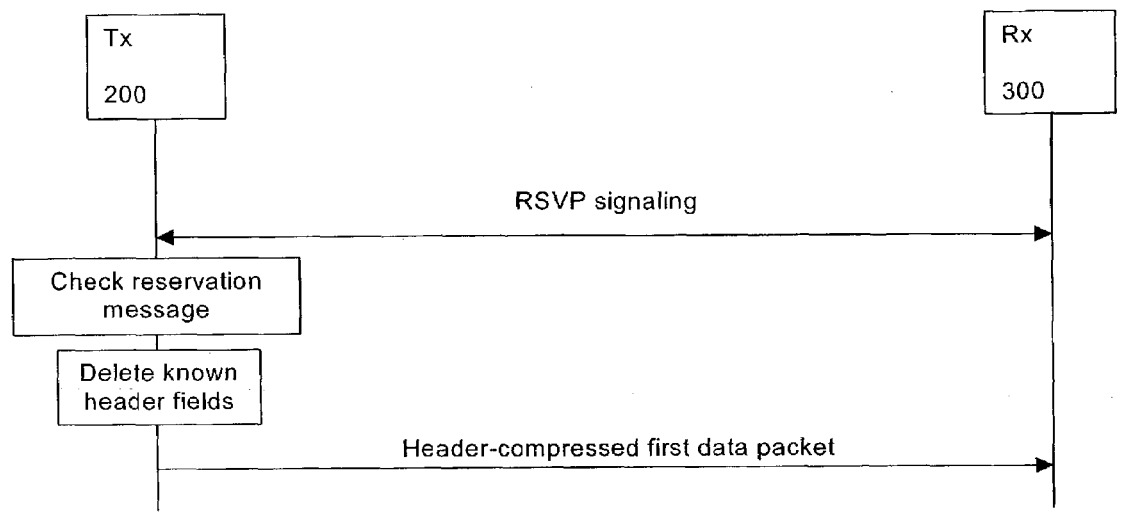
FIG. 5 shows a schematic flow diagram of a header compression initiation procedure according to a second preferred embodiment.

FIG. 5 shows a diagram indicating a signaling and processing scheme according to the second preferred embodiment. Details concerning RSVP can be gathered from the IETF (Internet Engineering Task Force) specification RFC 2205. The RSVP signaling contains the following header fields, which can again be used for compression purposes:

Source and destination address

Source and destination port

Flow Label (IPv6)

Protocol ID

In an RSVP connection, it is usually not possible to compress the packet headers, as RSVP relies on the existence of the header fields above for identifying the packets which belong to the connection in each node on the path. However, it is possible that a radio connection (or e.g. a tunnel similar to the GTP tunnel) is a part of this path, and RSVP may be used to set up this connection, as indicated in FIG. 5. In this case, the packets would be identified by being a part of a specific radio bearer (or by being sent through the specific tunnel), similar to the 3GPP case, and the packet headers can be compressed at the respective transmission entity of an intermediate network node, e.g. gateway or router, at the edge of the radio access network or at the tunnel endpoints. The information taken from the RSVP signaling could improve the efficiency of the header compression in the same way as the PDP Context signaling.

According to FIG. 5, a reservation message of the RSVP signaling can be checked for any header specific information at the setup control unit 202 of the transmitting entity 200, which information can thus be used to identify redundant header fields to be removed or compressed at the compressor 201. Similarly to FIG. 4, the header-compressed first data packet is then transmitted through the tunnel or "pipe" to the receiving entity 300.

It is noted that the proposed early header compression scheme is not restricted to the described PDP Context signaling or RSVP signaling, but actually applies to any scenario where signaling is used to set up a "virtual pipe", and where header compression is possible between the nodes in this pipe, which do not necessarily have to be the end nodes of the pipe.

One problem of the approach described here is that the decompressor 301 needs to know if the compressor 201 is using information from signaling messages to perform this "early compression", i.e. if the header of the first packet which arrives at the decompressor 301 is already compressed. This does not present a problem if this approach is standardized and mandatory. However, it is possible that this approach would be implemented on a non-standardized basis. In this case, it would be necessary to determine if "early compression" is being used. There are several possible approaches. It would be sufficient to set at least a single bit in the signaling messages, e.g. PDP Context Procedure, to indicate from the mobile terminal 10 that early compression is requested and to indicate from the network side that early compression is going to be performed. Both the mobile terminal 10 and the network side need to use the same algorithm to determine which header fields are going to be compressed.

Alternatively, the mobile terminal 10 or network side uses a preliminary signaling to notify its counterpart that early compression will be done on subsequent packets.

Another option would be to expect the decompressor 301 to automatically detect if early compression is used. The decompressor 301 knows which header fields can be compressed and can check if the expected values for these fields appear in the header of a received packet. If they appear in the header, then the packet was not compressed. It they do not appear in the header, it implies that early compression was used.

It is again noted, that the present invention is not restricted to the above preferred embodiments, but can be implemented in any packet data transmission link of cellular or fixed networks, where headers are used. Especially, the data packet(s) compressed on the basis of the initial or previous signaling not necessarily have to the first packet(s) to be transmitted after establishment, but can be other later or intermediate packets as well. The preferred embodiment may thus vary within the scope of the attached claims.

The invention claimed is:

1. A method comprising:
obtaining compression information from a signaling used to establish at least a part of a packet data connection configured to transmit data packets; and
using said compression information for compressing a header portion of at least one data packet transmitted after establishment of said packet data connection, wherein said header portion of said at least one data packet is compressed by removing those header field portions whose information has already been transferred by said signaling,
wherein said signaling is used for activating a context of said packet data connection.

2. A method according to claim 1, wherein said signaling is a packet data protocol context activation signaling.

3. A method according to claim 2, wherein said signaling information is obtained from a packet data protocol address parameter and/or a packet data protocol type parameter of said signaling.

4. A method according to claim 1, wherein said signaling is used for setting up a virtual pipe or tunnel.

5. A method according to claim 4, wherein said signaling is a resource reservation protocol signaling.

6. A method according to claim 4, wherein header compression is performed between network nodes connected to said virtual pipe or tunnel.

7. A method according to claim 6, wherein said network nodes are endpoints of said virtual pipe or tunnel.

8. A method according to claim 1, wherein said compression information comprises at least one of an IP destination address, an IP source address, an IP version, a port number, a flow label value, a protocol identification, a security parameter index, a type of service, a traffic class, a destination port range and a source port range.

9. A method according to claim 8, wherein said signaling information is obtained from a traffic flow template of said signaling.

10. A method according to claim 1, wherein said at least one data packet is at least the first data packet transmitted after establishment of said packet data connection.

11. A method according to claim 10, further comprising:
providing information specifying the compression of said at least first data packet to a packet data network; and
initializing an additional standard header compression function of said packet data network based on said provided information.

12. A method according to claim 11, wherein said header compression and said standard header compression function are performed concurrently.

13. A method according to claim 11, wherein said standard header compression function is a packet data conversion protocol header compression.

14. A method according to claim 11, wherein header compression is implemented as a part of said additional standard header compression function.

15. A method according to claim 11, wherein header compression and said standard header compression function are controlled by a terminal device connected to said packet data connection.

16. A method according to claim 1, further comprising negotiating header compression between a compressor functionality and a decompressor functionality.

17. A method according to claim 16, wherein said negotiation is based on a preliminary signaling.

18. A method according to claim 16, wherein said negotiation is based on a bit setting in a predetermined signaling message.

19. A method according to claim 1, further comprising detecting at a decompressor functionality if header compression is used.

20. A method according to claim 19, wherein said detection is performed by checking expected header field values.

21. A compression device comprising:
a control unit configured to obtain compression information from a signaling used to establish at least a part of a packet data connection, wherein the compression device is configured to compress a header portion of data packets transmitted via the packet data connection; and
a header compressing unit configured to compress, based on said obtained compression information, the header portion of at least one data packet transmitted after establishment of said packet data connection,
wherein said header portion of said at least one data packet is compressed by removing those header field portions whose information has already been transferred by said signaling,
wherein said signaling is used for activating a context of said packet data connection.

22. A device according to claim 21, wherein said compression device is arranged in a terminal device of a cellular network.

23. A device according to claim 22, wherein said terminal device is configured to control said header compression and an additional standard header compression functionality.

24. A device according to claim 21, wherein said compression device is arranged in a router device of a packet data network.

25. A decompression device comprising:
a control unit configured to derive a decompression information specifying said decompression, wherein said decompression device is configured to decompress a header portion of data packets transmitted via a packet data connection; and a header decompressing unit configured to decompress, based on said derived decompression information, the header portion of at least one data packet transmitted after establishment of said packet data connection, wherein said header portion of said at least one data packet is decompressed by replacing those header field portions whose information has already been transferred by a signaling, wherein said signaling is used for activating a context of said packet data connection.

26. A device according to claim 25, wherein said control unit is configured to derive said decompression information from a preliminary negotiation signaling.

27. A device according to claim 25, wherein said control unit is configured to derive said decompression information from a bit setting in a predetermined preliminary signaling message.

28. A device according to claim 25, wherein said decompression device is a serving general packet radio services support node or gateway general packet radio services support node.

29. A device according to claim 25, wherein said decompression device is a radio network controller.

30. A system for controlling header compression, comprising:

a compression device including a control unit configured to obtain compression information from a signaling used to establish at least a part of a packet data connection, and a header compressing unit configured to compress, based on said obtained compression information, the header portion of at least one data packet transmitted after establishment of said packet data connection; and a decompression device including a control unit configured to derive a decompression information specifying said decompression, and a header decompressing unit configured to decompress, based on said derived decompression information, the header portion of at least one data packet transmitted after establishment of said packet data connection, wherein said header portion of said at least one data packet is compressed by removing those header field portions whose information has already been transferred by said signaling, wherein said signaling is used for activating a context of said packet data connection.

31. A compression device comprising:

control means for obtaining a compression information from a signaling used to establish at least a part of a packet data connection, wherein the compression device is configured to compress a header portion of data packets transmitted via the packet data connection; and header compressing means for compressing, based on said obtained compression information, the header portion of at least one data packet transmitted after establishment of said packet data connection, wherein said header portion of said at least one data packet is compressed by removing those header field portions whose information has already been transferred by said signaling, wherein said signaling is used for activating a context of said packet data connection.

32. A decompression device comprising:

control means for deriving a decompression information specifying said decompression, wherein said decompression device is configured to decompress a header portion of data packets transmitted via a packet data connection; and header decompressing means for decompressing, based on said derived decompression information, the header portion of at least one data packet transmitted after establishment of said packet data connection, wherein said header portion of said at least one data packet is decompressed by replacing those header field portions whose information has already been transferred by a signaling, wherein said signaling is used for activating a context of said packet data connection.

* * * * *